(12) United States Patent
Jonassen et al.

(10) Patent No.: US 6,363,743 B1
(45) Date of Patent: Apr. 2, 2002

(54) METHOD FOR FORMULATING PARTICLES

(75) Inventors: Ola Jonassen, Bratsberg; Ingvald Strommen, Ranheim; Per Arne Schieflo; Odilio Alves-Filho, both of Trondheim, all of (NO)

(73) Assignee: Leiv Eiriksson Nyfotek AS, Trondheim (NO)

( * ) Notice: Subject to any disclaimer, the term of this patent is extended or adjusted under 35 U.S.C. 154(b) by 0 days.

(21) Appl. No.: 09/701,551

(22) PCT Filed: Jun. 1, 1999

(86) PCT No.: PCT/NO99/00172

§ 371 Date: Feb. 2, 2001

§ 102(e) Date: Feb. 2, 2001

(87) PCT Pub. No.: WO99/65600

PCT Pub. Date: Dec. 23, 1999

(30) Foreign Application Priority Data

Jun. 2, 1998 (NO) ................................................ 982502

(51) Int. Cl.$^7$ .............................. B01D 9/04; C02F 1/22; F25D 17/00; F25J 1/00

(52) U.S. Cl. .............................. 62/532; 62/57; 62/601; 62/533

(58) Field of Search ........................... 62/532, 57, 601, 62/602, 603, 533, 543, 384, 67; 34/258, 331, 337, 357, 362, 372, 373, 393

(56) References Cited

U.S. PATENT DOCUMENTS

| | | | | |
|---|---|---|---|---|
| 3,673,698 A | * | 7/1972 | Guerard | 34/5 |
| 4,073,158 A | * | 2/1978 | Guiller | 62/266 |
| 4,378,984 A | * | 4/1983 | Cheng et al. | 62/532 |
| 4,422,302 A | * | 12/1983 | Davis et al. | 62/57 |
| 6,098,410 A | * | 8/2000 | Horigane | 62/62 |

* cited by examiner

*Primary Examiner*—William C. Doerrler
(74) *Attorney, Agent, or Firm*—Pitney, Hardin, Kipp & Szuch LLP

(57) ABSTRACT

Method for formulating particles from solutions, wherein cooling the solution down to the initial freezing point, to mix the solution under pressure with an inert medium, to expand the solution to solid, fluidable frozen particles comprising the insert medium and the solution in a frozen shape.

5 Claims, No Drawings

METHOD FOR FORMULATING PARTICLES

The present invention is related to a method for formulating particles from solutions for processing in a fluid bed.

For drying known methods are utilizing among others mixture of solutions where the dried end product is mixed with a return flow with the product. Such a method, however, includes very different resting times for the product which is recirculated in relation to products not being recirculated. Additionally the flow of products substantially is increased through the drying chamber.

The solution is spread out or in other way laid on inert particles having a layer which thereafter is dried. The layer is peeled in the drying chamber thereafter to be taken out as dried powder in a cyclon, or the particles are taken out of the chamber for peeling. Such a method easily pollutes the dried product from the inert particles. Furthermore, the inert particles which substantially do not pollute, are relatively heavy particles needing very large amounts of energy supplied to the fans to maintain the particles in fluidized condition.

With the method according to the present invention substantial advantages are achieved in relation to known methods, whereby the advantages with the known method substantially are maintained and the disadvantages avoided. In this way a strongly reduced recilient time is achieved, strongly reduced flow of products through the dryer, no pollution of the product from the inert particles, reduced claim for energy for the fans and furthermore also a possibility to control the density and porousity of the end product.

The above mentioned advantages are achieved with the method according to the invention as defined with features stated in the claims.

The method according to the invention may be utilized to produce frozen fluidable particles of solutions thereby using an inert medium in such a way that the solutions may be dried in a fluidized drying chamber. The inert medium as such is disappearing by supplication during drying or already during the formulation of the particles. The method also may be utilized for particle formation if the need for further processing is not drying, but may be performed in a fluid bed.

According to the invention the solution to be dried, is cooled down to the initial freezing point. Thereafter the solution is mixed with the inert medium under pressure, thereafter to be expanded to compact, frozen particles comprising the inert medium as well as the solution in a frozen state. Alternatively, the fluidable particles may be produced from the inert medium which thereafter is covered by the solution. This certainly must be made in such a way that the particles as such do not melt. The particles normally are produced in a size of 0.5 to 5 mm. The inert medium to be sublimized during drying or expansion, can be for example be $N_2$, $CO_2$ or such.

Equipment necessary for forming the method may be constructed for batch or continuous operation whether two components are mixed in a pressurised container. The pressurised container should have valve for expansion of the mixture to particle shape. This is performed in a cold room in such a way that the particles do not melt.

The mixing relation as well as the pressure in the container and thereby also the temperature of the expanded particles, are adjusted in such a way that the desired density is achieved for the particles. The desired density is desired partly based on the fluidising properties of the particles in the following drying chambers and the defined claims for the dried end product.

By production of inert particles to be covered with the solution, the clean inert particles initially are produced in an equipment corresponding with the equipment described above, or in another way, for example by granulation. The particles are covered with the solution which already is undercooled to the initial freezing point. The thickness and the initial temperature of the layer for the clean inert particles have to be adjusted to ensure that melting is avoided Addition of the layer may be performed in an ordinary industrial equipment for this purpose in a batch or continuous production process. Preferably the equipment is arranged in a cold room. The following drying is performed in a normal fluidized drying chamber having a lower temperature than the lowest melting temperature of the particles.

By drying the particle formulation in a closed circuit having low temperature, substantial quality advantages are achieved in relation to known drying processes, especially because volatile components such as aromatic components are preserved.

What is claimed is:

1. Method for formulating particles from a solution, CHARACTERIZED IN cooling the solution down to the initial freezing point, mixing the solution under pressure with an inert medium, expanding the solution through a throttling valve or nozzle to solid, fluidable frozen particles comprising both the inert medium and the solution in a frozen shape.

2. Method by formulating particles from a solution, CHARACTERIZED IN producing fluidable particles of an inert medium and covering the particles with the solution, and expanding the solution through a throttling valve or nozzle.

3. Method according to claim 2, CHARACTERIZED IN covering the particles with the solution in such a way that the particles do not melt.

4. Method according to claim 1, CHARACTERIZED IN manufacturing the particles in a range of 0.5 to 5 mm.

5. Method according to claim 1 CHARACTERIZED IN the insert medium is chosen from the group consisting of $N_2$ and $CO_2$ which sublimes during drying or by expansion.

* * * * *